(12) United States Patent
Kelley, Jr.

(10) Patent No.: US 7,055,507 B2
(45) Date of Patent: Jun. 6, 2006

(54) CONTINUOUSLY VARIABLE DRIVE FOR SUPERCHARGERS

(75) Inventor: William R. Kelley, Jr., Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 110 days.

(21) Appl. No.: 10/811,655

(22) Filed: Mar. 29, 2004

(65) Prior Publication Data

US 2005/0211231 A1 Sep. 29, 2005

(51) Int. Cl.
*F02B 33/00* (2006.01)
*F02B 33/44* (2006.01)
*F02B 39/04* (2006.01)
*F02B 39/06* (2006.01)

(52) U.S. Cl. .................. 123/559.1; 123/561
(58) Field of Classification Search ............. 123/559.1, 123/561
See application file for complete search history.

(56) References Cited

U.S. PATENT DOCUMENTS

| 3,665,787 A | * | 5/1972 | Wikinson | 123/561 |
| 4,145,888 A |   | 3/1979 | Roberts | 60/608 |
| 4,505,117 A |   | 3/1985 | Matsuoka | 60/609 |
| 4,506,648 A |   | 3/1985 | Roberts | 123/564 |
| 5,063,904 A | * | 11/1991 | Winkelmann et al. | 123/559.1 |
| 5,105,793 A | * | 4/1992 | Winkelmann et al. | 123/559.1 |
| 5,133,325 A | * | 7/1992 | Winkelmann | 123/561 |
| 5,158,427 A |   | 10/1992 | Shirai | 415/110 |
| 5,256,109 A | * | 10/1993 | Winkelmann et al. | 123/561 |
| 5,443,054 A | * | 8/1995 | Tateno et al. | 123/559.1 |
| 5,462,035 A |   | 10/1995 | Teraoka et al. | 123/561 |
| 5,493,862 A |   | 2/1996 | Folsom | 60/404 |

(Continued)

FOREIGN PATENT DOCUMENTS

| DE | 3521403 A1 | * | 12/1986 |
| GB | 2263308 A | * | 7/1993 |
| JP | 03168329 A | * | 7/1991 |
| JP | 04203421 A | * | 7/1992 |

OTHER PUBLICATIONS

Patent Abstracts of Japan, vol. 1996, No. 02, Feb. 29, 1996 & JP 07 269365 A (Komatsu Ltd.), Oct. 17, 1995 "Abstract".

(Continued)

*Primary Examiner*—Sheldon J Richter
(74) *Attorney, Agent, or Firm*—Brinks Hofer Gilson & Lione; Greg Dziegielewski

(57) ABSTRACT

A drive assembly for a supercharger for an internal combustion engine provides a continuously variable drive ratio between the engine and supercharger to provide a substantially, constant drive speed to the supercharger, thereby optimizing performance. The continuously variable drive may function in increments as well as allow the supercharger to free-wheel. The drive assembly includes a planetary gear drive assembly and a continuously variable hydrostatic transmission having a rotating, variably coupled master and slave pump and motor which, by adjusting its drive ratio, adjusts the ratio of the planetary gear assembly and thus the drive ratio between the engine and the supercharger.

19 Claims, 6 Drawing Sheets

U.S. PATENT DOCUMENTS

| | | | | |
|---|---|---|---|---|
| 5,575,152 A | 11/1996 | Folsom | ............... | 60/492 |
| 5,678,405 A | 10/1997 | Folsom | ............... | 60/492 |
| 5,875,766 A * | 3/1999 | Ozawa | ............... | 123/561 |
| 5,890,468 A * | 4/1999 | Ozawa | ............... | 123/561 |
| 6,050,093 A | 4/2000 | Daudel et al. | ............... | 60/602 |
| 6,062,022 A | 5/2000 | Folsom et al. | ............... | 60/438 |
| 6,609,505 B1 * | 8/2003 | Janson | ............... | 123/559.1 |
| 2003/0089348 A1 | 5/2003 | Janson | ............... | 123/559.1 |

OTHER PUBLICATIONS

Patent Abstracts of Japan, vol. 1998, No. 03, Feb. 27, 1998 & JP 09 287462 A (Hitachi Ltd.), Nov. 4, 1997 "Abstract".

Patent Abstracts of Japan, vol. 1996, No. 11, Nov. 29, 1996 & JP 08 189369 A (Tochigi Fuji Ind. Co. Ltd.), Jul. 23, 1996 "Abstract".

* cited by examiner

CONTINUOUSLY VARIABLE DRIVE FOR SUPERCHARGERS

BACKGROUND OF THE INVENTION

The invention relates generally to drive assemblies for superchargers and more specifically to a continuously variable drive assembly for optimizing the speed of a supercharger driven by an internal combustion engine.

Increasing the volume of air provided to the cylinders of an internal combustion engine during its intake cycle and thereby increasing the density of the air during the compression and ignition strokes has long been recognized as a means of increasing the horsepower output of an internal combustion engine. Two classes of equipment have been relied upon to achieve this goal: turbochargers and superchargers. Turbochargers are defined as devices of the class which are driven by a turbine exposed to the exhaust gasses of the engine to which the turbocharger is providing increased air pressure. Likely the most common and widely recognized issue with a turbocharger is what is referred to as turbo lag. Since the turbocharger depends upon an engine's exhaust gasses to drive it and increase its speed, when increased power output of the engine is desired, the turbocharger cannot increase its speed to increase engine performance until the flow of exhaust gasses increases to increase its rotational speed. Thus, inherent in the design is a delay from the feedback nature of the device. While there are design approaches which reduce turbo lag such as minimizing the rotating mass of the turbocharger, turbo lag remains a concomitant to turbocharger designs.

Superchargers, on the other hand, achieve a similar goal, but rather than being driven by engine exhaust gasses, they are driven directly by a fan belt or belt which is driven by the crankshaft pulley. In this configuration, as the speed of the engine increases, the speed of the supercharger immediately and proportionally increases. Hence, the problem of turbo lag is essentially eliminated. However, due to the wide variation in engine speed, typically from 700–800 R.P.M. at idle to 6,000–8,000 R.P.M. or higher at red line, a supercharger is subjected to a wide variation in drive speeds. This wide variation interferes with optimum operation as many supercharger designs provide their best performance enhancing capabilities when driven at a constant or substantially constant speed.

Attempts have been made to achieve this goal. For example, U.S. Pat. No. 5,462,035 teaches a supercharger which is driven through a continuously variable transmission (CVT) comprising a pair of variable diameter pulleys interconnected by a belt. The present invention is directed to a drive assembly for a supercharger which maintains a substantially constant supercharger drive speed notwithstanding variations in the speed of the associated internal combustion engine.

BRIEF SUMMARY OF THE INVENTION

A drive assembly for a supercharger for an internal combustion engine provides a continuously variable drive ratio between the engine and supercharger to provide a substantially, constant drive speed to the supercharger, thereby optimizing performance. The continuously variable drive may function in increments as well as allow the supercharger to free-wheel. The drive assembly includes a planetary gear drive assembly and a continuously variable hydrostatic transmission having a rotating, variably coupled master and slave pump and motor which, by adjusting its drive ratio, adjusts the ratio of the planetary gear assembly and thus the drive ratio between the engine and the supercharger.

It is an object of the present invention to provide a substantially constant speed drive assembly for a supercharger for an internal combustion engine.

It is a further object of the present invention to provide a variable speed drive assembly for a supercharger for an internal combustion engine having a planetary gear drive assembly and hydrostatic drive assembly.

It is a still further object of the present invention to provide a constant speed drive assembly for a supercharger for an internal combustion engine having a planetary gear assembly controlled by a continuously variable hydrostatic drive assembly.

Further objects and advantages to the present invention would become apparent by reference to the following description of the preferred embodiment and appended drawings wherein like reference numbers refer to the same component, element, or feature.

DESCRIPTION OF THE PREFERRED EMBODIMENT

Figure 1:
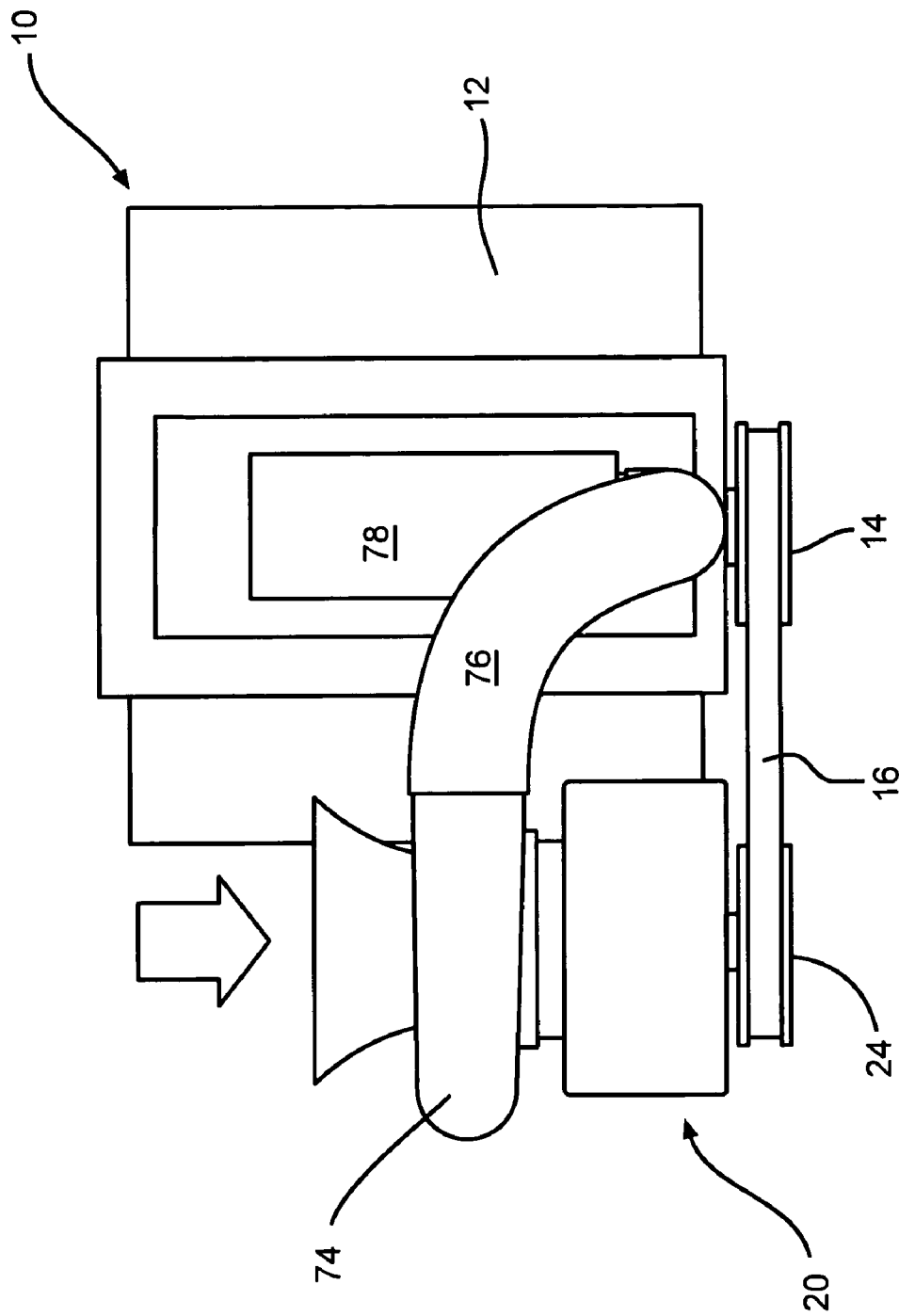
FIG. 1 is a perspective view of a supercharger assembly according to the present invention mounted upon an internal combustion engine.
Figure 2:
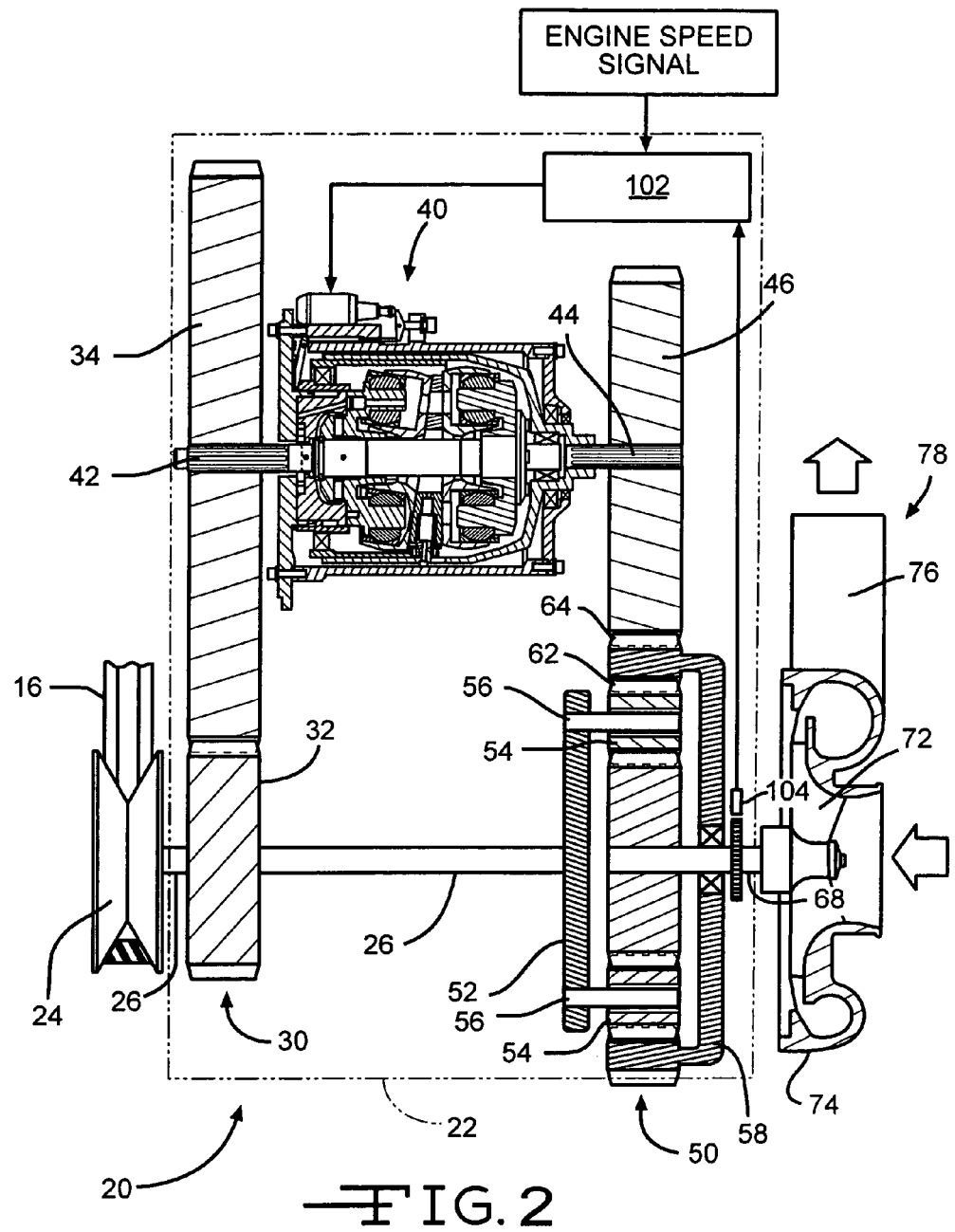
FIG. 2 is a diagrammatic view of a variable speed drive assembly for a supercharger according to the present invention.

Referring now to FIG. 1, an internal combustion engine is illustrated and generally designated by the reference number 10. The internal combustion engine 10 is essentially conventional, may be a gas or Diesel engine and includes an engine block 12 within which reside a plurality of pistons and a crankshaft (both not illustrated) which are coupled to a crankshaft pulley 14. The crankshaft pulley 14 is engaged by a drive belt 16 which provides mechanical energy to various components of the engine 10 such as a water pump, an alternator, or steering pump and air conditioning compressor (all not illustrated). The internal combustion engine 10 also includes a supercharger assembly 20 which is driven by the belt 16 and increases the air pressure within the intake manifold of the internal combustion engine 10 in accordance with conventional practice.

The supercharger assembly 20 includes a housing 22 which receives, supports and protects various components of the assembly 20. The drive belt 16 is received upon a pulley 24 secured to an input shaft 26 which provides rotary energy to the supercharger assembly 20. A first gear train 30 includes a pinion gear 32 which is secured to the input shaft 26, rotates therewith and engages a larger diameter spur input gear 34. The spur gear 34 drives a continuously variable hydrostatic transmission assembly 40. Specifically, the spur gear 34 is secured to and drives an input shaft 42 of the continuously variable hydrostatic transmission assembly 40. The hydrostatic transmission assembly 40 also includes an output shaft 44 which is coupled to and drives a spur output gear 46.

The input shaft 26 also drives a second gear train assembly 50. Specifically, the input shaft 26 is directly coupled to and drives a carrier 52 which freely rotatably supports a plurality of planet gears 54 on associated stub shafts 56. The planet gears 54 engage a circular ring gear 58 having both internal or female gear teeth 62 which engage the planet gears 54 and external or male gear teeth 64 which engage and are driven by the second spur gear 46 on the output shaft 44 of the continuously variable hydrostatic transmission assembly 40. Disposed centrally within the carrier 52 and driven by the planet gears 54 is a sun gear 66 which is secured to and supported upon an input shaft 68 which drives the supercharger assembly 70. The supercharger assembly 70 includes an impeller 72 which is secured to the input shaft 68. The impeller 72 is disposed within a suitably shaped preferably involute housing 74 which channels the air compressed by the impeller 72 into an outlet duct 76 which leads to an intake manifold 78 on the internal combustion engine 10 (illustrated in FIG. 1).

Figure 3:
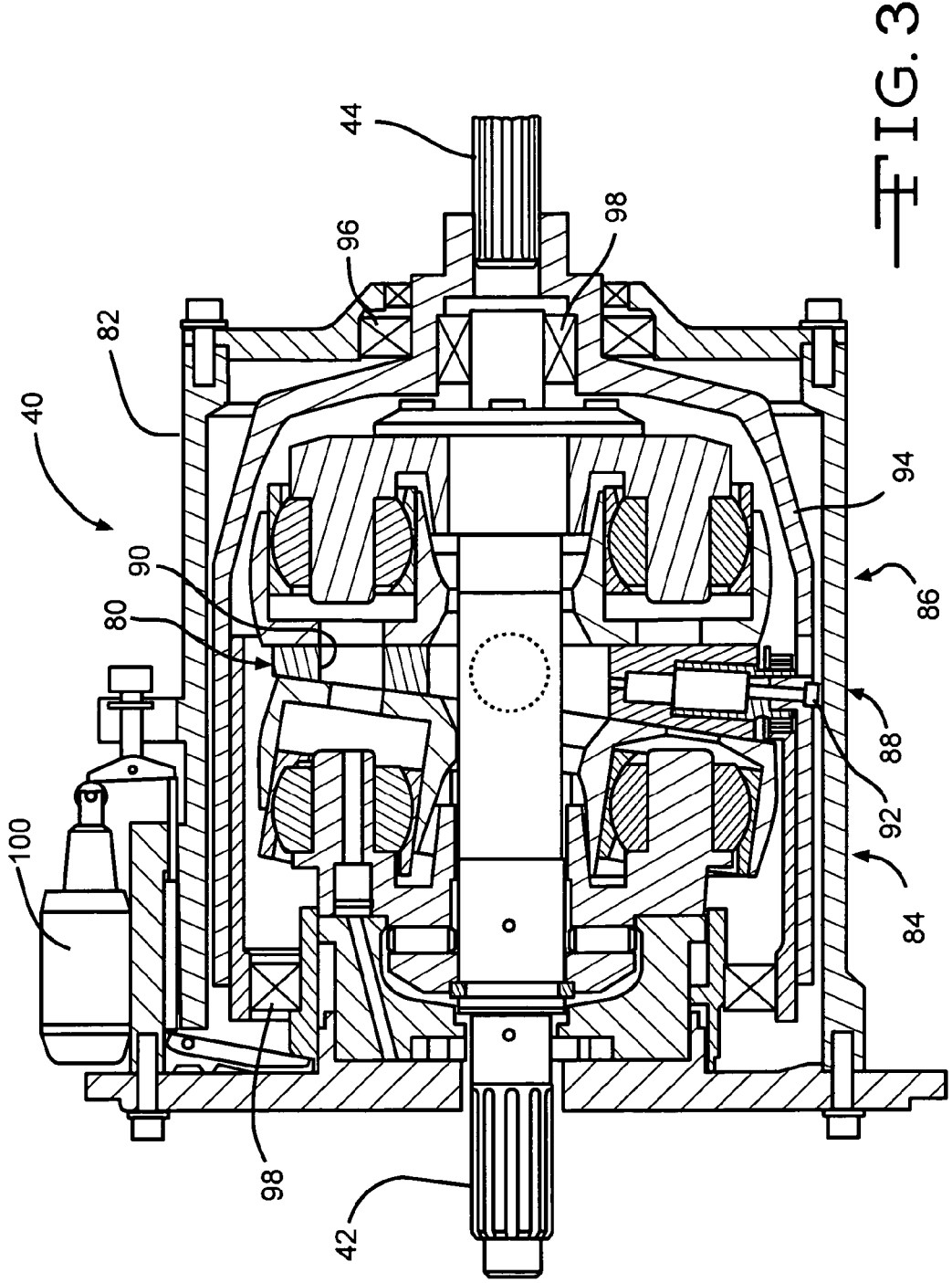
FIG. 3 is an enlarged, full sectional view of a hydrostatic continuously variable transmission assembly according to the present invention.

Referring now to FIG. 3, the continuously variable hydrostatic transmission assembly 40 is seen to include a housing 82 which supports and encloses various components of the assembly 40 such as the input shaft 42 and the coaxially disposed output shaft 44. Within the housing 82, the input shaft 42 is connected to and drives a hydraulic motor assembly 84. A hydraulic pump assembly 86 is also disposed within the housing 82 in axially opposed and aligned relationship with the motor assembly 84. A wedge shaped swashplate assembly 88 is disposed between the motor assembly 84 and the pump assembly 86 and includes a plurality of through passageways 90 which provide fluid communication between the motor assembly 84 and the pump assembly 86.

The motor assembly 84 and the pump assembly 86 exert first and second components of torque on the swashplate assembly 88 in the rotational direction of the input shaft 42 and the hydraulic pressure in the passageways 90 of the swashplate assembly 88 exerts a third component of torque in the same direction on the swashplate assembly 88. The third component of torque is a product of the hydraulic pressure and the differential area of the two ends of the higher pressure passageways 90 at the narrower and thicker portions of the wedge shaped swashplate assembly 88. Thus, the swashplate assembly 88 rotates in the direction of the third torque component.

The swashplate assembly 88 is drivingly connected to the output shaft 44 by drive pins 92, one of which is illustrated in FIG. 3, which engage a bell shaped housing 94. The bell shaped housing 94 is rotatably supported by an external anti-friction bearing such as a ball bearing assembly 96 and internal anti-friction bearings such as the ball bearing assemblies 98. An actuator or controller 100 which may be a bi-directional, linear electric actuator, a double acting hydraulic actuator such as a spool valve, a spring biased hydraulic cylinder or a double acting or spring biased pneumatic cylinder, for example, is linked to the swashplate assembly 88 for the purpose of pivotally adjusting the angle of orientation of the swashplate assembly 88 relative to the axes of the input shaft 42 and the output shaft 44 thereby setting the ratio of the transmission assembly 40 between the input shaft 42 and its speed and the output shaft 44 and its speed.

Further details of the continuously variable hydrostatic transmission assembly 40 may be found in U.S. Pat. No. 5,575,152 which is hereby incorporated by reference.

Since a purpose of the present invention is to provide a supercharger drive assembly 20 which drives a supercharger assembly 70 at a substantially constant speed, notwithstanding variations in the speed of the associated internal combustion engine 10, control componentry will now be briefly described. At the outset, it should be understood that since virtually every contemporary internal combustion engine 10 utilizes electronic engine management controls and one type of information generally always available from such electronic engine controls is engine speed, i.e., R.P.M., this information will be readily available. Once the engine R.P.M. is known, the speed of the input shaft 42 can be readily inferred or calculated by the use of a scaling factor corresponding to the relative sizes of the crankshaft pulley 14 and the pulley 24 on the input shaft 26. If open loop control is satisfactory, this information can be provided to a microprocessor 102 having an output which drives the controller 100. In this configuration, the controller 102 will include a read only memory or look up table relating engine (or pulley) speed to a required position of the controller 100 which will provide a desired output speed to the impeller 72. If, however, closed loop control is desired, a speed sensor 104 such as a Hall effect, variable reluctance or optical sensor may by associated with a tone wheel on the input shaft 68 to the supercharger impeller 72. Provided with the actual speed of the input shaft 68 and the impeller 72, the microprocessor 102 provides an output signal to the controller 100 which appropriately positions the swashplate assembly 88.

Figure 4:
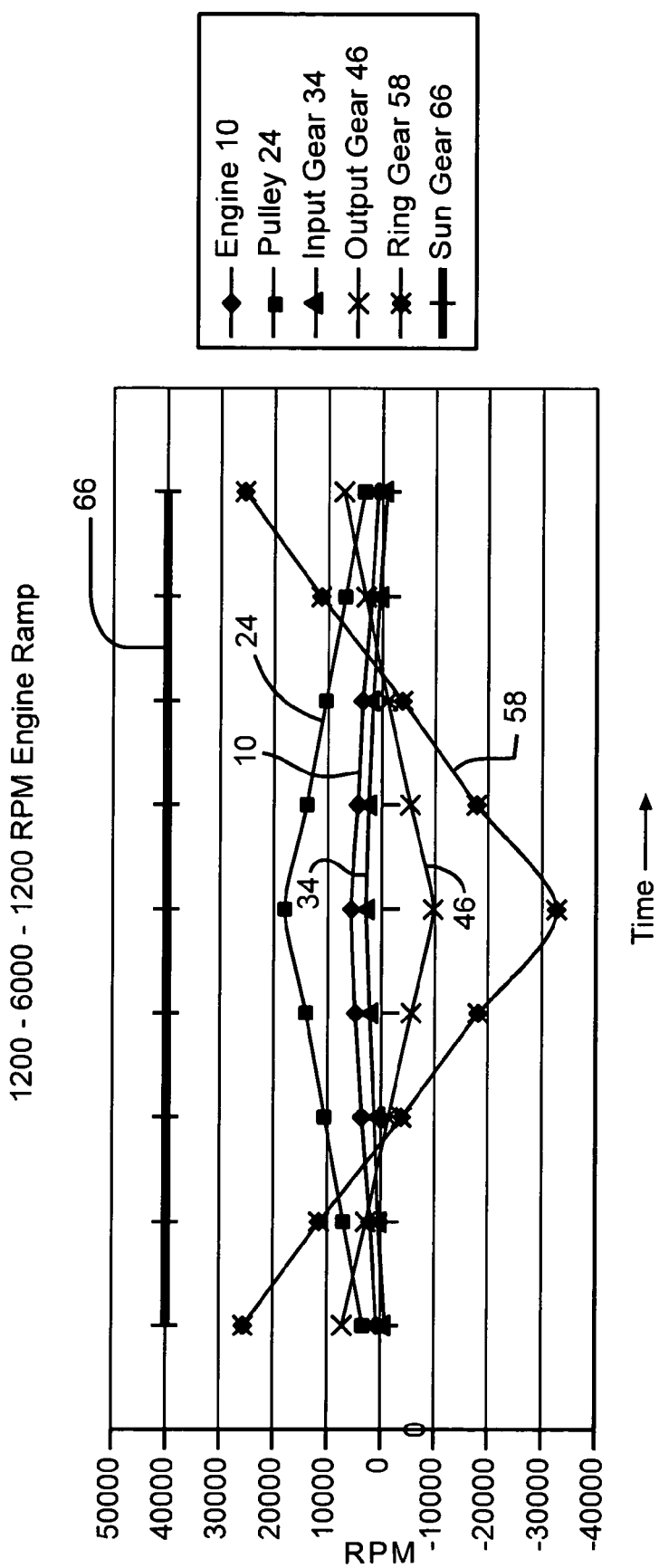
FIG. 4 is a graph illustrating the various speeds of the components of the variable speed drive assembly for a supercharger according to the present invention operating in an active mode.

FIG. 4 illustrates the relationship between the various speeds of the supercharger drive assembly 20 in the active mode as the continuously variable transmission assembly 40 is controlled to achieve a constant supercharger speed. FIG. 4 illustrates the various component speeds as the speed of the internal combustion engine 10 is changed from 1200 R.P.M. through 6000 RPM and back to 1200 R.P.M. It should be noted that during this time, the speed of the supercharger impeller 72, the uppermost line in FIG. 4, remains constant at 40,000 R.P.M. FIG. 4 also illustrates the significant change of speed of the internal ring gear 58. As the speed of the engine 10 moves from 1,200 R.P.M. to 6,000 R.P.M., the speed of the ring gear 58 which is initially approximately 26,000 R.P.M. changes to approximately 31,000 R.P.M. in the opposite direction. As the speed of the internal combustion engine 10 decreases, the speed change reverses.

Figure 5:
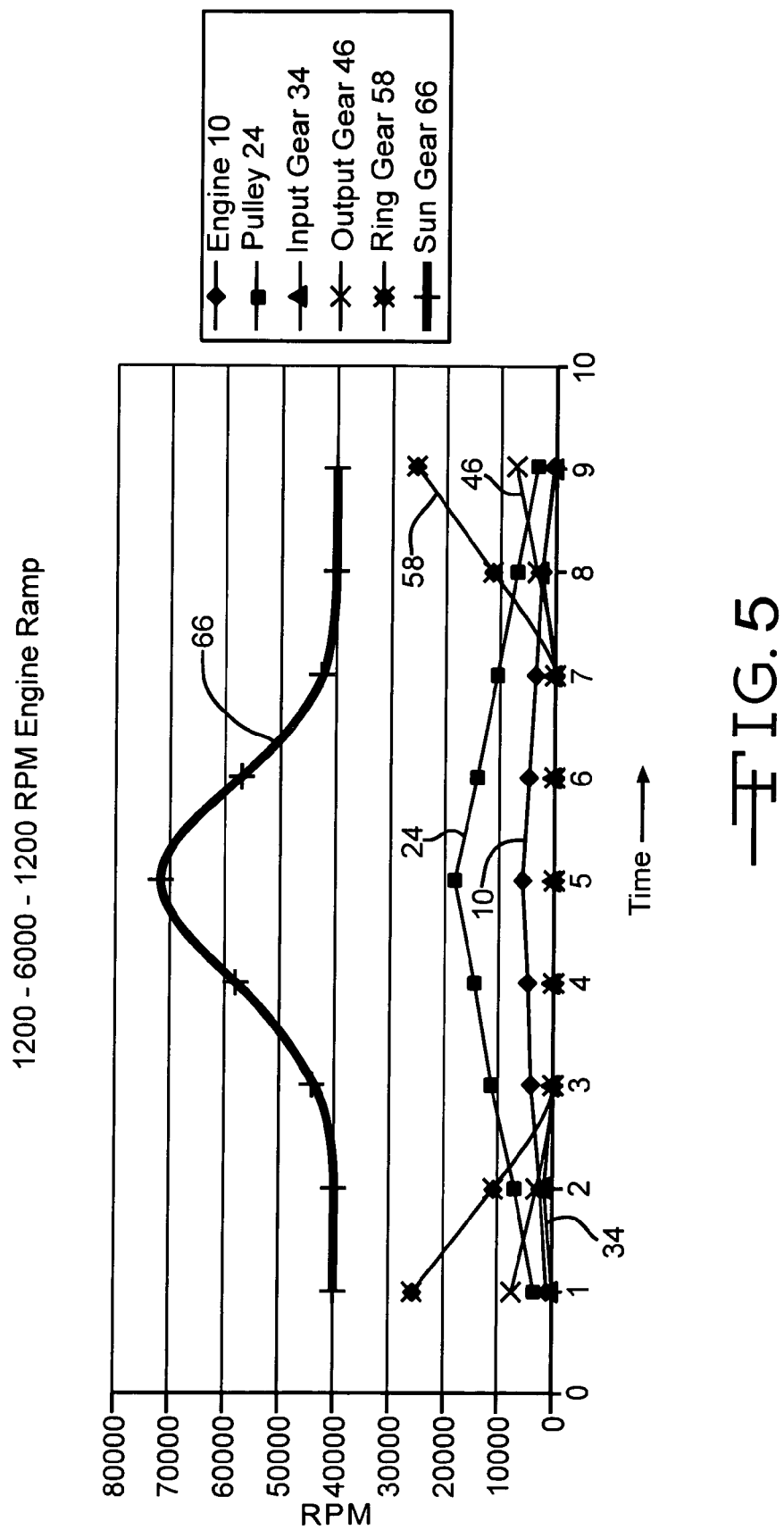
FIG. 5 is a graph illustrating the various speeds of the components of the variable speed drive assembly for a supercharger according to the present invention operating in an open mode.

FIG. 5 illustrates the performance of the supercharger drive assembly 20 in what is referred to as the open mode. The open mode is that operating region wherein the continuously variable transmission assembly 40 operates where the speed of the pulley 24 and the ratio through the planetary drive which, is typically 4:1, cannot provide the minimum 40,000 rpm to the supercharger assembly 72. Once again, it will be appreciated that the test protocol involves initial operation of the internal combustion engine 10 at 1,200 R.P.M. sweeping through 6,000 R.P.M. and back to 1,200 R.P.M.

Figure 6:
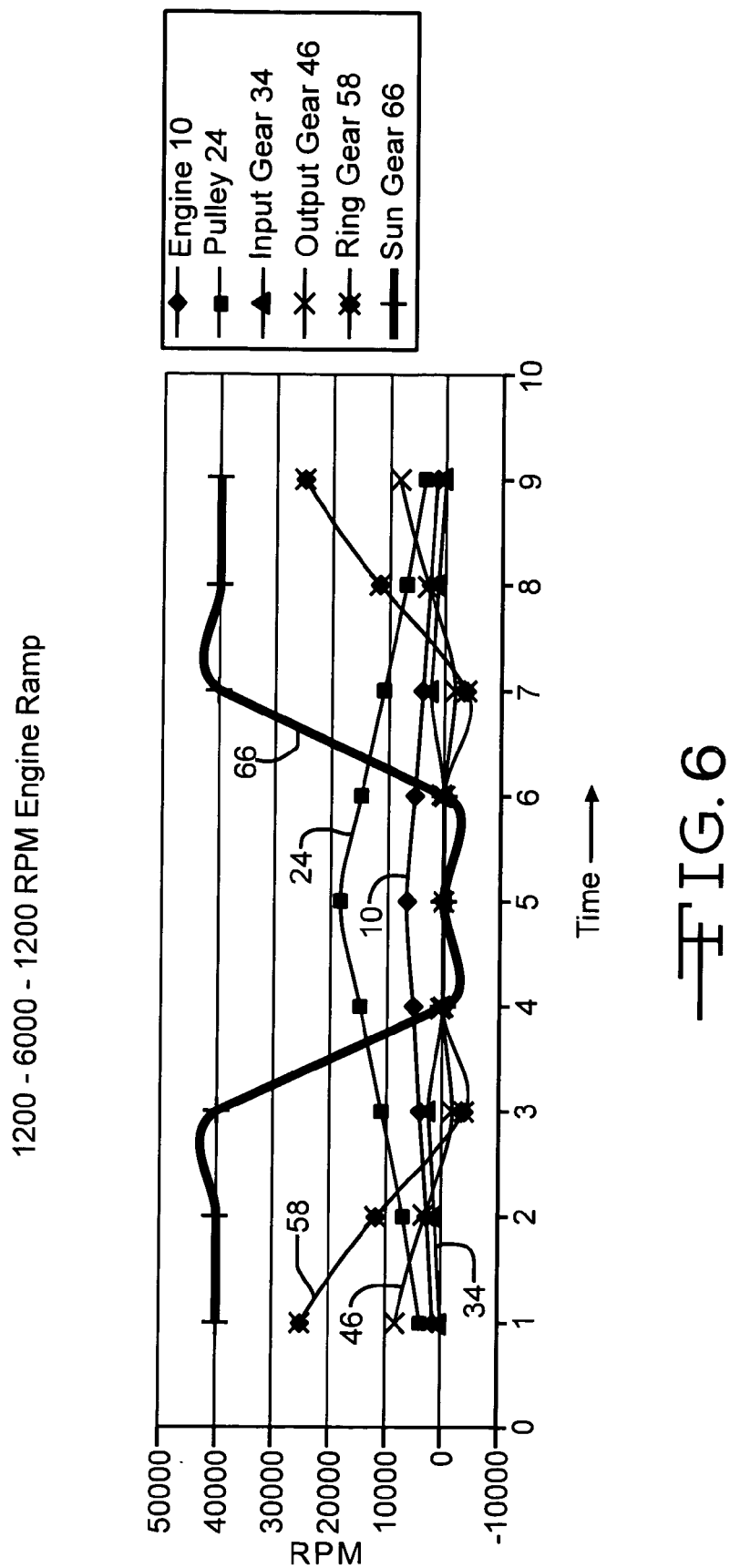
FIG. 6 is a graph illustrating the various speeds of the components of the variable speed drive assembly for a supercharger according to the present invention in a free-wheeling mode.

Referring now to FIG. 6, the graph therein illustrates operation in a free wheeling or uncoupled mode. Here, the continuously variable hydrostatic transmission assembly 40 operates until it is decided to open the planetary drive, uncouple the supercharger assembly 20 and allow the impeller 72 to free wheel. Once again, in the test illustrated, the speed of the internal combustion engine 10 is swept from 1,200 R.P.M. up to 6,000 R.P.M. and back to 1,200 R.P.M.

It should be noted that the terms "variable speed", "continuously variable" and "constant speed" used throughout this patent application refer generally to the input, drive assembly and output, respectively, of the supercharger drive assembly 20 for the supercharger assembly 72. Specifically, the term "variable speed" refers generally to the input of the device and the fact that the speed of the input can vary over a significant range, as does the speed of the internal combustion engine 10 which drives it. The term "continuously variable" refers generally to the variable speed drive ratio achieved by the continuously variable hydrostatic transmission assembly 40 and the gear trains 30 and 50. The term "constant speed" refers generally to the output of the device and its drive to the supercharger assembly 72 which is at a substantially constant speed, notwithstanding the variability of the speed of the input.

The foregoing disclosure is the best mode devised by the inventor for practicing this invention. It is apparent however, that devices incorporating modifications and variations will be obvious to one skilled in the art of supercharger drive assemblies. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

The invention claimed is:

1. A drive assembly for a supercharger comprising, in combination,
    an input adapted for driving by an internal combustion engine,
    a hydrostatic transmission having a motor assembly driven by said input, a pump assembly and a swash plate assembly driving an output gear,
    a planetary gear assembly having a carrier coupled to said input and supporting a plurality of planet gears, a ring gear having internal gear teeth engaged by said planet gears and external gear teeth engaged by said output gear of said hydrostatic transmission and a sun gear engaged by said planet gears, and
    a supercharger having an impeller operably coupled to said sun gear.

2. The drive assembly for a supercharger of claim 1 wherein said input shaft includes a pulley and said pulley is driven by a belt.

3. The drive assembly for a supercharger of claim 1 further including a drive gear on said input shaft and a driven gear engaged by said drive gear for driving said hydrostatic transmission.

4. The drive assembly for a supercharger of claim 1 further including a microprocessor having means for receiving a speed of an engine and means for adjusting ratio of input and output speeds of said hydrostatic transmission.

5. The drive assembly for a supercharger of claim 1 further including means for sensing a speed of said turbocharger impeller and means for adjusting a ratio of input and output speeds of said hydrostatic transmission.

6. The drive assembly for a supercharger of claim 5 wherein said means for sensing includes a tone wheel disposed for rotation with said sun gear and a sensor disposed in sensing relationship with said tone wheel.

7. A drive assembly for a supercharger comprising, in combination,
    an input shaft adapted to be driven by an internal combustion engine,
    a continuously variable hydrostatic transmission having a motor assembly driven by said input shaft, a pump assembly and a swash plate assembly driving an output,
    a planetary gear assembly having a carrier coupled to said input shaft and supporting a plurality of planet gears, a ring gear having internal gear teeth engaged by said planet gears and driven by said output of said continuously variable hydrostatic transmission and a sun gear engaged by said planet gears and having a sun gear, and
    a supercharger having an impeller driven by said sun gear.

8. The drive assembly for a supercharger of claim 7 further including a drive gear on said input shaft and a driven gear engaged by said drive gear for driving said hydrostatic transmission.

9. The drive assembly for a supercharger of claim 7 wherein said input shaft includes a pulley and said pulley is driven by a belt.

10. The drive assembly for a supercharger of claim 7 including a microprocessor adapted to receive a speed of and an engine and means for adjusting the ratio of input and output speeds of said continuously variable transmission.

11. The drive assembly for a supercharger of claim 7 further including a gear on said output of said hydrostatic transmission and external gear teeth on said ring gear engaged by said gear on said hydrostatic transmission output.

12. The drive assembly for a supercharger of claim 7 further including means for sensing a speed of said turbocharger impeller and means for adjusting the ratio of input and output speeds of said hydrostatic transmission.

13. The drive assembly for a supercharger of claim 12 wherein said means for sensing includes a tone wheel disposed for rotation with said sun gear and a sensor disposed in sensing relationship with said tone wheel.

14. A constant speed drive assembly for a supercharger comprising, in combination,
    an input shaft adapted to be driven by an internal combustion engine,
    a continuously variable hydrostatic transmission having a motor assembly driven by said input shaft, a pump assembly, a swash plate assembly driving an output and a controller for adjusting the speed ratio between said input shaft and said output,
    a planetary gear assembly having a carrier coupled to said input shaft and supporting a plurality of planet gears, a ring gear coupled to said output of said continuously variable transmission and having internal gear teeth engaged by said planet gears and a sun gear engaged by said planet gears, and
    a supercharger having an impeller coupled to said sun gear,
    a microprocessor means having a speed input and an output driving said controller.

15. The drive assembly for a supercharger of claim 14 wherein said input shaft includes a pulley and said pulley is driven by a belt.

16. The drive assembly for a supercharger of claim 14 further including a drive gear on said input shaft and a driven gear engaged by said drive gear for driving said continuously variable transmission.

17. The drive assembly for a supercharger of claim 14 further including a tone wheel disposed for rotation with said sun gear and a sensor disposed in sensing relationship with said tone wheel.

18. The drive assembly for a supercharger of claim 14 wherein said microprocessor includes means for receiving a speed of an engine and means for adjusting the ratio of input and output speeds of said continuously variable transmission.

19. The drive assembly for a supercharger of claim 14 further including a gear on said output of said hydrostatic transmission and external gear teeth on said ring gear engaged by said gear on said hydrostatic transmission output.

\* \* \* \* \*